No. 646,212. Patented Mar. 27, 1900.
W. F. HALL.
LAWN MOWER.
(Application filed May 6, 1899.)
(No Model.) 2 Sheets—Sheet 1.
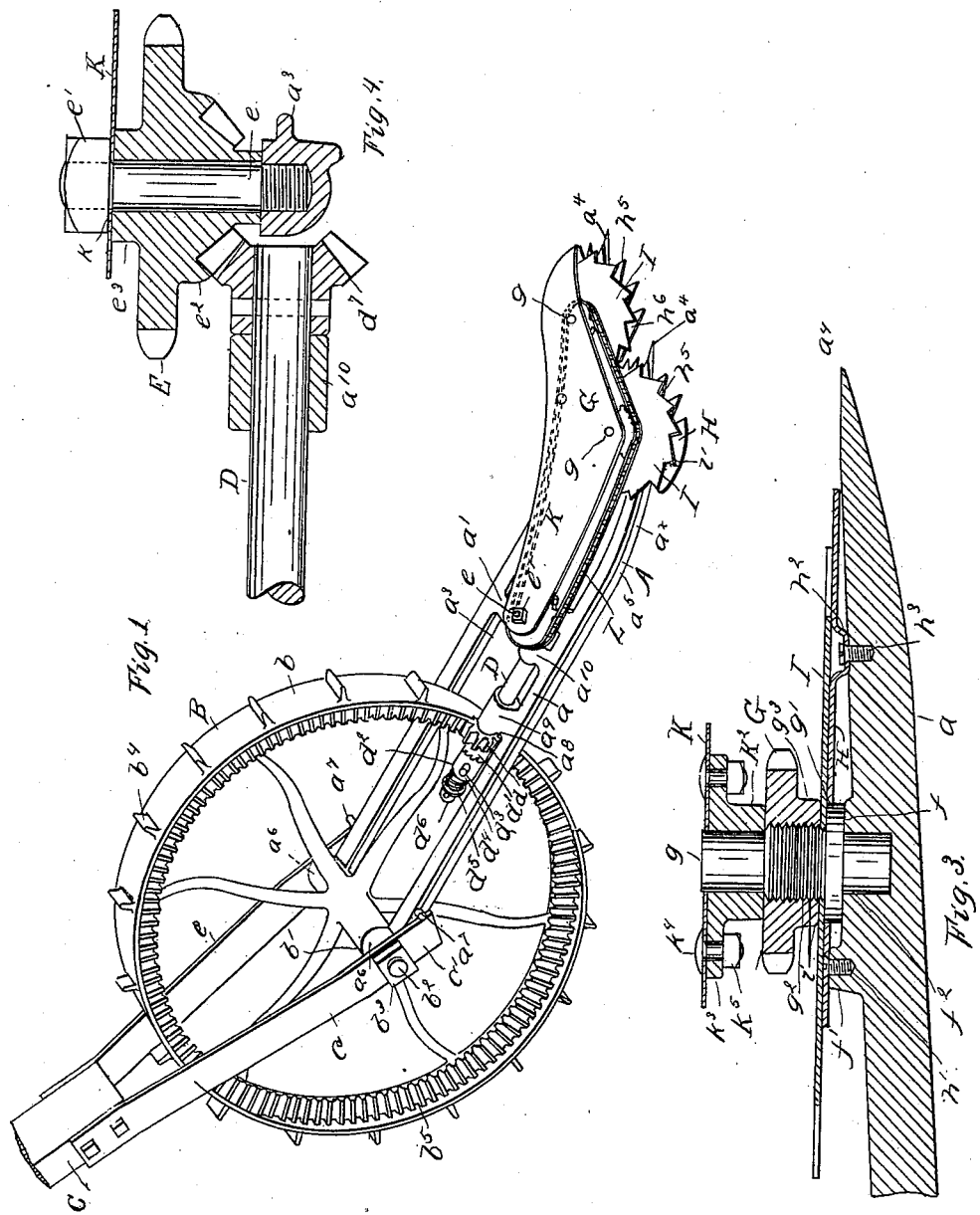
Witnesses.
Inventor
William F Hall
By Rich'd H. Manning
Att'y

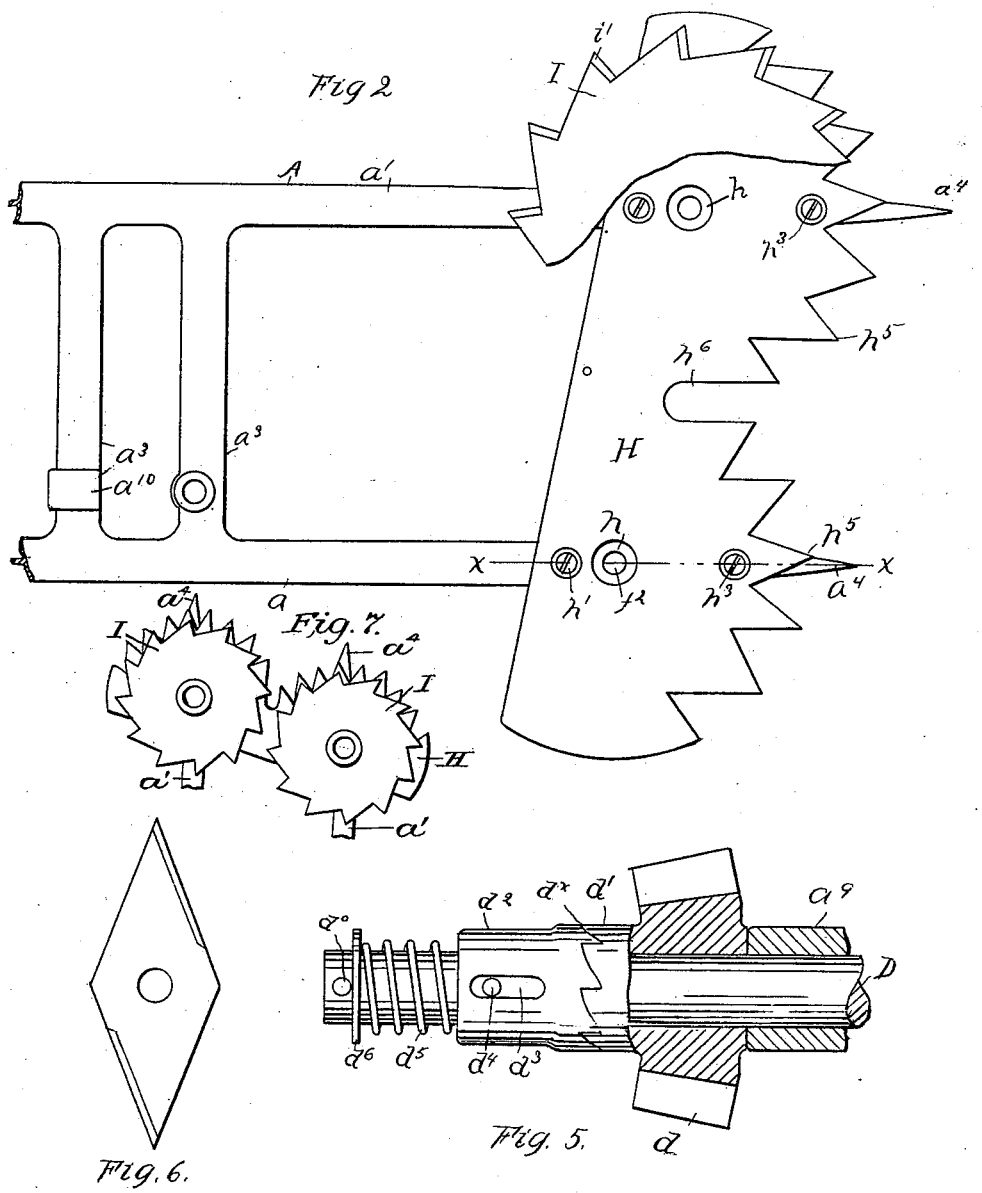

UNITED STATES PATENT OFFICE.

WILLIAM F. HALL, OF RAYTOWN, MISSOURI.

LAWN-MOWER.

SPECIFICATION forming part of Letters Patent No. 646,212, dated March 27, 1900.

Application filed May 6, 1899. Serial No. 715,889. (No model.)

*To all whom it may concern:*

Be it known that I, WILLIAM F. HALL, a citizen of the United States of America, residing at Raytown, in the county of Jackson and State of Missouri, have invented certain new and useful Improvements in Lawn-Mowers; and I do hereby declare that the following is a full, clear, and exact description of the invention, such as will enable others to make and use the same, reference being had to the accompanying drawings, forming a part of this specification.

My invention has for its object, primarily, a mower for the varied uses of cutting the undergrowth in planted fields as well as the grass upon lawns and between shrubbery and in places beneath sidewalks usually inaccessible to the ordinary lawn-mower, and, second, to leave the windrow at one side of the mower.

My invention consists in the novel construction and combination of parts such as will be first fully described, and specifically pointed out in the claims.

In the drawings, Figure 1 is a view in perspective of the improved lawn-mower with the upper end of the handle removed. Fig. 2 is a plan view in detail of the frame of the mower, showing the guard-plate and one of the rotary saw-toothed cutters broken away. Fig. 3 is a vertical sectional view of the forward end of the mower-frame and cutting devices, taken upon the line $xx$ of Fig. 2. Fig. 4 is a detail view of the lower end of the main driving-shaft, showing the stud and seat on the mower-frame adjacent thereto, the combined sprocket-wheel and bevel-gear, and the meshing gear on the driving-shaft in vertical section. Fig. 5 is a detail view of the rear end of the driving-shaft, showing the automatic clutch upon an enlarged scale. Fig. 6 is a modification of the rotary grass-cutter. Fig. 7 is a plan view in detail showing the forward ends of the bars, the guard-plate, and the rotary grass-cutters.

Similar letters of reference indicate corresponding parts in all the figures.

Referring to the drawings, A represents the frame of the improved lawn-mower, which consists of the parallel T-bars $a\ a'$, which are connected together at points nearly equidistant from their opposite ends by the webs $a^3$. The forward end of the bar $a'$ extends a considerable distance beyond the forward end of the bar $a$, the sides of each bar converging to a single point, as at $a^4$. Said forward ends of the bars $a\ a'$ are also bent in an upward direction at an angle to the rear ends of said bars at a point $a^5$ a short distance in rear of the terminal $a^4$ of said ends, so as to form runners to the mower, the under side of each runner extending upwardly and outwardly to the point $a^4$ of said bars. Upon the rear end of each bar $a\ a'$ is an eye $a^6$. Between the rear ends of bars $a\ a'$ is the single driving-wheel B, ordinarily fourteen inches in height, with a broad periphery $b$ and a hub $b'$, extending a short distance beyond the lines of the outer edges of the periphery $b$. The rear ends of the bars $a\ a'$ are pivotally connected with the bolt $b^2$, which passes through the said hub and the eyes $a^6$ and is threaded at one end and provided with a nut $b^3$. Upon the periphery of the wheel B are ribs $b^4$, which are arranged transversely in position and at proper distances apart in the direction of the circumference of the wheel. Upon the inner edge of the periphery of the wheel B, toward the bar $a$, is a bevel-gear $b^5$.

C represents the handle of the mower, a sufficient portion of which is shown for illustration. The lower end portion of said handle C is forked at $c\ c$, and said forked portions extend upon the respective sides of the wheel B and are pivotally connected with the bolt $b^2$, bearing against the outer sides of the eyes $a^6$. The lower ends of said forked portions are also extended at $c'$ a short distance past the pivotal point of connection with the bolt $b^2$. Said handle C is held in the proper rearwardly-inclined position by the lugs $a^7$ on the outside portions of the bars $a\ a'$ a short distance from the eyes $a^6$ on the ends of said bars, against which the extended end portions $c'$ of the forked portions $c\ c$ of the handle C come in contact. On the inner side of bar $a$, a short distance from the periphery of wheel B, toward the forward end of the bars $a$, is an extension $a^8$, upon which is a journal-bearing $a^9$, and upon the web $a^3$, opposite the extension $a^8$, is a journal-bearing $a^{10}$.

In the journal-bearings $a^9\ a^{10}$, parallel with bar $a$, is a shaft D of considerable length, upon which shaft is loosely mounted pinion $d$, which engages with the bevel-gear $b^5$ on the side of wheel B. On the end of the pinion $d$, toward the rear end of shaft D, is rigidly connected the portion $d'$ of a toothed clutch, having the teeth $d^\times$ extending around said shaft. $d^2$ is the other portion of the clutch, which consists of a sleeve having teeth fitted to engage with the teeth $d^\times$ in the portion $d'$ of the clutch. In the sleeve $d^2$ is a slot $d^3$, in which slot is a pin $d^4$, extending within the shaft D. $d^5$ is a spiral spring extending around shaft D and bearing at one end against the sleeve $d^2$. The other end bears against the collar $d^6$, which collar is secured on the shaft D by the lug or pin $d^0$, extending through the rear end of the said shaft. Upon the forward end of shaft D is a bevel-gear $d^7$. In the forward web $a^3$, in line with the journals $a^9$ $a^{10}$, is a stud $e$, upon which is journaled loosely a sprocket-wheel E, integral with which upon its under side is a bevel-gear $e^2$, which meshes with the bevel-gear $d^7$ on the forward end of shaft D. The upper end of stud $e$ is screw-threaded and provided with a nut $e'$. Upon the upper side of the sprocket-wheel E is a short hub $e^3$.

A considerable distance in rear of the forward end of bar $a$ of frame A is a horizontal plane surface $f$ nearly the width of said bar, in which is an opening or bearing $f^2$. At the rear end of said plane surface $f$ is an upward extension $f'$, extending a short distance above the plane of surface $f$. In the bearing $f^2$ is inserted the lower end of a journal $g$, the upper end of which journal is nearly upon a level with the upper end of stud $e$. Upon the lower end of journal $g$ is cast a circular flange $g'$, the under surface of which bears upon the plane surface $f$. From the flange $g'$ the journal $g$ is increased in circumference and screw-threaded, as at $g^2$, a short distance in the direction of its upper end. At the forward end of bar $a'$ of frame A is a horizontal plane surface having an opening in which is fitted a flanged journal of the same construction as the journal $g$. Upon the upper surface and forward ends of the bars $a$ $a'$ is the guard-plate H, which extends diagonally to frame A from the outer edge of bar $a$ to the outer edge of bar $a'$ and a short distance beyond the outer edges of said bars.

In the plate H are openings $h$, through which pass the separate journals $g$ $g$, said plate resting upon the upward extensions $f'$ at its rear end, to which extensions the plate H is secured by the screws $h'$, the forward end of said plate being supported by the stamped depressions in said plate $h^2$ and secured to the bars $a$ $a'$ by the screws $h^3$. The forward edge of the guard-plate H comprises serrations or saw-teeth $h^5$, whose points lie in arcs of circles. In the plate H, between the respective arcs described by the teeth $h^5$ $h^5$, is a rearwardly-extended opening $h^6$.

Upon each one of the journals $g$ is a circular flat plate I, in the center of which is a screw-threaded opening $i$ to receive the said journals, said plate resting upon the flange $g'$ of each journal. In the periphery of each plate I are serrations or teeth $i'$, which are directly in position above the teeth $h^5$ of the guard-plate, the points of which teeth $h^5$ are a short distance in rear of the forward ends of the bars $a$ $a'$ of frame A. The teeth $i'$ on plate I are the ordinary beveled saw-teeth and sharpened in like manner. Upon each journal $g$ is a sprocket-wheel G, having an internally-screw-threaded hub $g^3$ on its under side, which is fitted to the screw-threaded portion $g^2$ of the journal $g$ and turned so as to clamp the plate I between the said sprocket-wheel and the flange $g'$ on said journal.

Above the cutting-plates I I is a cap-plate K, which extends from the upper end of one journal $g$ to the upper end of the other journal $g$ and also to the upper end of the stud $e$, at which point the said plate is narrow in width and perforated at $k$ to receive the upper end of the said stud $e$, which plate bears lightly upon the hub $e^3$ of said sprocket-wheel, the nut $e'$ preventing the accidental removal of said cap-plate. Upon the under side of the cap-plate and above the cutting-disks I I are journal-bearings $k^2$, which consist of collars extending around the upper end of each journal $g$ and having an annular flange $k^3$ at the upper end of the collar, which is secured to the said plate by the bolts $k^4$, upon which are nuts $k^5$, the lower end of the collar resting lightly upon the sprocket-wheel G, the upper ends of said journal extending through the cap-plate upon the same plane as the upper surface of said plate.

Around the sprocket-wheel E is extended one end of a sprocket-chain L, the other end of which chain is extended around the separate sprocket-wheels G G and the two ends of the chain connected together in the usual manner.

In operation the power applied to the handle C to give a forward movement to the frame A causes rotation of wheel B, and being prevented from slipping upon the ground by the lugs $b^4$ a positive energy is communicated through the bevel-gear $b^5$ to the pinion $d$ on shaft D and through said shaft to the sprocket-chain L, causing a rotation of the circular cutting-disks I I, which rotate in the same direction. The grass as the movement advances enters between the separate teeth of the guard-plate. The grass is given a shear cut, and as one cutting-disk is in advance of the other the cut grass is thrown from the advance cutting-disk laterally upon the rear cutting-disk, which latter disk deposits the cut grass in windrows to be readily taken up, and thus leaving the path of the mower in its front clear of obstruction to the cutting devices. Coarse grass or weeds which may be encountered and enter the opening $h^6$ in the guard-plate in quantity will meet a front and rear cut from the serrations of the cutter-plates I I, which approach within a short distance of each other in the circle of rotation. The plates I I are capable of being rotated with great speed under the high gear of the mower. Ordinarily the forward ends of the bars $a\, a'$ of frame A rest upon the ground, and in this position the grass is cut short. When the grass is simply required to be clipped, the depression of handle C will elevate the forward end of the frame A, and the weight of the frame is borne by the single wheel B, the degree of elevation being readily maintained by the hands of the operator as the mower moves forward. When the machine is run backward, the pinion $d$ forces back the portion $d^2$ of the backing ratchet or clutch, and the teeth upon both portions of the clutch slip by each other and continue to do so until the direction of movement of frame A is changed to a forward movement, when the spring $d^5$, which is compressed by the sleeve $d^2$, throws the separate portions of the clutch into closer engagement and the shaft D resumes its movement.

Instead of circular cutting-disks I may vary the form of cutters to that shown in Fig. 6, if preferred, and such like changes within the scope of the invention in the construction of the mower.

The power being applied from a single wheel to the cutting devices enables the mower to be operated upon lawns having depressions in which the ordinary lawn-mower would fail to enter. In my invention the clogging of the cutting devices by the cut grass is obviated and the grass removed from the path of the mower.

Having fully described my invention, what I claim as new, and desire to secure by Letters Patent, is—

1. A lawn-mower comprising a single driving-wheel and a bevel-gear upon one side of said wheel longitudinally-extended bars pivotally connected at their rear ends with the axis of said wheel, and the forward ends bent upwardly at an angle to the rear ends, webs connecting said bars, a horizontal guard-plate upon the forward ends of said bars and rotary grass-cutters journaled in said guard-plate, and sprocket-wheels upon the journals for said cutters, a stud upon the said bars in rear of said cutters, and a sprocket-wheel upon said stud, a bevel-gear upon said stud integral with the sprocket-wheel, a cap-plate having bearings for the upper ends of said journals and stud, a sprocket-chain extending around said sprocket-wheels, a rotary driving-shaft journaled upon said bars in rear of said stud, and a bevel-gear upon one end of said shaft meshing with the bevel-gear on said stud, and a bevel-gear upon the other end of said shaft, meshing with the bevel-gear on said driving-wheel.

2. In a lawn-mower, a journal having an annular flange and a screw-threaded portion above said flange, a rotary cutting-plate having a screw-threaded opening adapted to be fitted to the screw-threaded portion of said journal, and a wheel having an internally-screw-threaded hub upon the threaded portion of said journal, adapted to be clamped upon the cutting-plate.

3. In a lawn-mower comprising forwardly-extended bars, unequal in length, having their forward ends bent upwardly at an angle to the rear ends of said bars, a main driving-wheel having its axis pivotally connected with the rear ends of said bars, a handle having a forked lower end, also pivotally connected with the axis of the main driving-wheel, and lugs upon the sides of said bars, a guard-plate connected with the forward ends of said bars and arranged at an angle thereto, and having teeth upon its forward edge the points of which lie in arcs of circles, circular grass-cutting plates having teeth in the circumference of said plate and journaled in said guard-plate, in proximity to the teeth in the guard-plate, and power-conveying devices substantially as described upon the main driving-wheel and said frame, and also upon the journals of said circular cutting-plates, actuating said cutting-plates.

WILLIAM F. HALL.

Witnesses:
JOHN T. MARSHALL,
PETER MINICK.